Patented Mar. 4, 1952

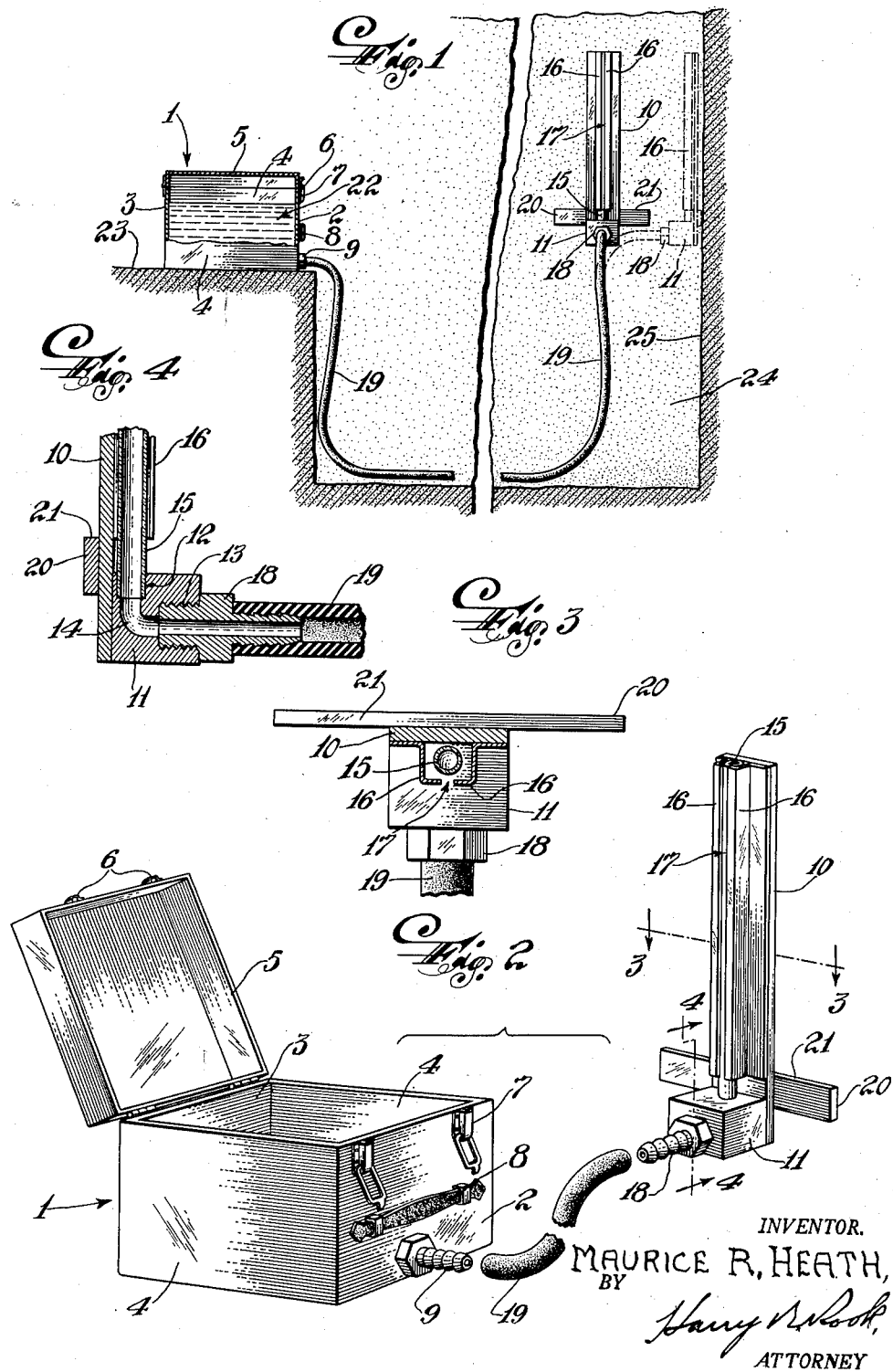

2,587,998

UNITED STATES PATENT OFFICE 2,587,998

HYDROSTATIC MEASURING AND LEVELING APPARATUS

Maurice R. Heath, Dallas, Tex.

Application August 3, 1949, Serial No. 108,280

2 Claims. (Cl. 33—209)

This invention relates to hydrostatic apparatus for measuring and leveling a plurality of comparatively remote points on a wall or the like.

A prime object of the present invention is to provide a portable measuring or gauge device adapted to utilize a water level for accurately measuring the elevation at various points on a surface or surfaces.

Another object is to provide hydrostatic measuring and leveling apparatus having a transparent tube with a straight edge device conveniently associated therewith serving as a standard for taking measurements and serving to assist in making a fixed mark or line on the surface being measured.

A further object is to provide apparatus of this character that is simple in construction, inexpensive to manufacture and highly efficient in operation.

In carrying out the invention, I utilize the principle that water seeks its own level and I have accordingly provided a container for a supply of water and a measuring device including a transparent tube and a straight edge associated therewith whereby a fixed water level is established and is readily transmitted to various remote points on a surface.

Other advantages of the invention will be apparent from the description thereof to follow taken in connection with the accompanying drawing in which—

Figure 1 is an elevational view of apparatus embodying my invention shown in operative position, parts being broken away.

Figure 2 is an enlarged perspective view in elevation of the improved apparatus.

Figure 3 is an enlarged cross-sectional view taken on the plane of the line 3—3 of Figure 2.

Figure 4 is an enlarged vertical sectional view taken on the plane of the line 4—4 of Figure 2.

The apparatus shown comprises a box or container 1 of suitable material having a front wall 2, rear wall 3 and side walls 4, 4. A lid or cover 5 is hinged to the rear wall and carries fastening members or hasps 6 adapted to coact with fastening members or hasps 7 on the outer surface of the front wall for holding the cover closed. A handle 8 may be provided on the front wall for carrying the box around. A nipple 9 extends through and is supported by the lower end of the front wall.

Associated with the container is a portable measuring or leveling device comprising an elongated metal plate 10 with a metal block 11 secured to its front face at the lower end thereof. The block is formed with an opening or socket 12 in its upper surface and with a screw threaded opening or socket 13 in its front surface. A curved passage 14 connects the upper and front sockets of the block.

Seated in the upper socket 12 and extending longitudinally along the front surface of the plate to a point even with its upper end is a tube 15 of glass or other suitable transparent material. The tube is protected by angular guard plates 16, 16 suitably secured to the front face of the plate with their edges spaced from each other leaving an elongated window or space 17. Threaded into the front socket 13 of the block is nipple 18.

A flexible conduit or hose 19 preferably of rubber connects the nipples 9 and 18 thus establishing communication between the container 1 and the glass tube 15. The hose may be of any suitable length and diameter.

Secured to the rear surface of the plate 10 and projecting across and beyond its sides adjacent its lower end and adjacent the top edge of the block 11 is a transverse piece or bar 20, the top edge 21 of which is straight. This straight edge constitutes a transverse liquid level indicating line and by means of a pencil or the like (not shown) facilitates making an indicating mark or line on the surface being measured.

In using the apparatus, water or other liquid 22 is placed in the container 1 and the container placed on a supporting surface such as indicated at 23 in Figure 1 of sufficient height for the purpose desired. The water will flow through the conduit 19 to the measuring or leveling device in accordance with the law that water will seek its own level.

The measuring or leveling device serves as a gauge for marking or leveling off a plurality of remote points on a wall or other surface which it is desired to measure. The gauge device is placed against the surface to be measured, such as the wall 24 shown in Figure 1, at a certain height thereon, at the area to be measured, the elongated guard plates 16, 16 serving as a handle for this purpose. The device is then moved up and down along the surface, all of the time the water in the tube being watched by the user. The water in seeking to reach its own level will move up and down in the tube and hose. The desired point is reached when the water level in the tube is coincident with the upper straight edge 21 of the cross bar 20. When this condition prevails, a pencil or the like is moved across said straight edge so that a mark or line may be impressed upon the surface being measured thereby indicating the desired point or level at which the work, for example, is to be performed. The next desired point is obtained by moving the gauge device and repeating the performance at the zone or area on the surface next to be measured, which area may be on the same wall 24 or on the adjacent wall 25 as shown in Figure 1 or on any adjacent or opposite wall (not shown).

It will be understood that as many points as desired may be measured and marked off by merely moving the gauge device and repeating the performance.

The improved apparatus, with the aid of a ruler or tape, may also be used for other purposes, such as establishing grades.

It will be seen that this apparatus is economical to manufacture, every part being easily and cheaply made. Some of the parts are of stock material. Furthermore the parts are easily assembled and any part may be easily disconnected and a new part substituted if repairing is necessary. The hose can readily be disconnected from the container and gauge device and such hose and device easily packed in the container and carried around.

The apparatus is especially advantageous in that it can be transported, set up and operated by one man without the necessity for any additional tools or instruments.

What I claim is:

1. Hydrostatic measuring and leveling apparatus comprising, in combination, a portable container for liquid, a flexible hose having one end connected to said container and communicating with the interior thereof, a portable gauge device including an elongated flat plate, a block secured to the front of said plate at its bottom end and having communicating socket portions in its upper and front surfaces, a transparent tube supported in the upper socket in upright position along the plate, a nipple supported in the front socket at right angles to said transparent tube and connected to the other end of said hose, a cross bar supported on the rear of said plate adjacent said block, said bar having an upper straight edge for sighting the level of liquid in the tube and for serving as a means for aiding in drawing a straight line on the surface being measured and angle plates disposed partially around said tube for guarding the same and for serving as a handle for manipulating said gauge device.

2. Hydrostatic measuring and leveling apparatus comprising, in combination, a portable box-like container for liquid having means for connecting a conduit thereto, a flexible container having one end separably connectable to said means on said container, and a portable indicating device including a transparent tube connected to the other end of said conduit, said container being of a size and having an open top and a closure therefor such that said flexible conduit may be disconnected from said means and coiled and both said conduit and said indicating device can be packed and transported in said container.

MAURICE R. HEATH.

REFERENCES CITED

The following references are of record in the file of this patent:

UNITED STATES PATENTS

| Number | Name | Date |
| --- | --- | --- |
| 277,037 | LeGrande | May 8, 1883 |
| 547,864 | Sherman | Oct. 15, 1895 |
| 1,042,248 | McGowan | Oct. 22, 1912 |
| 1,231,162 | Husby | June 26, 1917 |
| 1,566,174 | Tyler | Dec. 15, 1925 |
| 2,481,847 | Langley | Sept. 13, 1949 |